Aug. 24, 1943.   J. A. CEROW, JR   2,327,959
VALVE OPERATING MEANS
Filed Nov. 25, 1941    2 Sheets-Sheet 1

INVENTOR.
Joseph A. Cerow, Jr.
BY Walter C. Ross, Attorney.

INVENTOR.
Joseph A. Cerow, Jr.
BY Walter C. Ross, Attorney

Patented Aug. 24, 1943

2,327,959

UNITED STATES PATENT OFFICE 2,327,959

VALVE OPERATING MEANS

Joseph A. Cerow, Jr., Suffield, Conn., assignor to The Chapman Valve Manufacturing Co., Indian Orchard, Mass., a corporation of Massachusetts Application November 25, 1941, Serial No. 420,410

3 Claims. (Cl. 137—139)

This invention relates to improvements in apparatus for operating valves, that is apparatus for moving the disc, wedge or gate of a valve, sluice gate or the like between open and closed positions.

The principal objects of the invention are directed to the provision of apparatus adapted to positively move the wedge or gate from its open position and vice versa and to arrest the movement thereof after it has been so moved.

It is common practice in recent years in connection with automatically-operated valves and sluice gates that the gate or wedge be moved from open to closed position or vice versa in a short space of time. To accomplish this high speed, motors and gearing are employed.

Due to the high speed the gate or wedge overtravels or drifts after the limit of its movement which results in damage to the structure. To obviate this it is necessary that movement of the gate or wedge be stopped coincidental with its reaching its open or closed position.

Prior art mechanisms for operating the gate or wedge at high speed and for arresting movement thereof have not been entirely satisfactory due to the fact that high speed operation brings about more drift or overtravel than former slow speed operation for which prior art apparatus was designed.

According to this invention, means is provided to arrest movement of the wedge or gate instantly when the same reaches its open or closed position.

This is accomplished by the provision of such a prime mover as an electric motor that is positively connected by driving mechanism to the spindle means for the wedge or gate in combination with means for controlling the operation of the motor in such a way that when the wedge or gate has reached the limit of its movement, circuit changes take place to reverse the motor and, during reversal as the motor comes to rest, the circuit connections are broken whereby the motor stops.

In this way the tendency of the motor to overtravel or drift is eliminated by reversing its direction of rotation but at the same time it is stopped against rotation.

The novel features of the invention are adapted for broad application in connection with valves of all types having movable gates, wedges or discs and with sluice gates, check valves and the like having movable members. The invention is also adapted for use in connection with valve apparatus gates and the like having outside or rising spindles, as well as those having inside or non-rising spindles, hence reference herein to a valve, gate and spindle-means relates generally to all types of valves and sluice gates and their discs, wedges or gates and spindle construction for operating the same.

Figure 1:
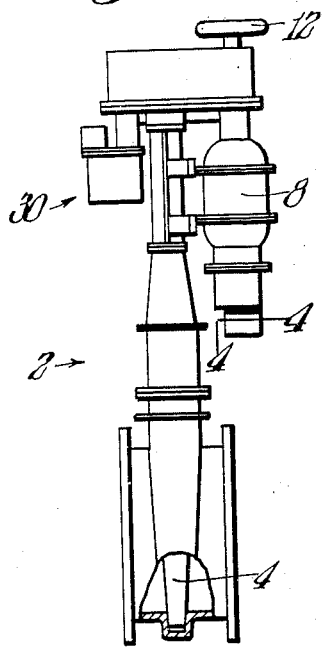
Fig. 1 is a small scale elevational view showing a gate valve with the novel features of the invention associated therewith.

Referring to the drawings more in detail, the invention will now be fully explained.

A valve is represented by 2 which has a wedge or gate 4 movable between open and closed positions. A spindle 6 is provided which in the form of the invention shown is of the outside or rising type. It is provided with screw threads so that a rotatable part in engagement therewith, on being rotated, will act on the spindle so that it opens or closes the wedge.

With the inside type the spindle is rotated, and being threaded in the wedge, on rotation it moves the wedge. Spindle-means referred to herein includes the rotatable part threadedly engaging the spindle or the spindle and rotating parts causing the spindle screw threads to actuate the wedge.

An electric motor 8 of the reversible type is shown that has a shaft 10. The motor is secured to the valve structure in some suitable manner and there is a hand wheel 12 on the motor shaft 10 to facilitate manual operation of the valve. Gearing 14, 16, 18 and 20 provides positive driving connections between the motor shaft 10 and the spindle means which may include a part 22 threaded on the spindle 6.

As the motor is operated in one direction or the other the spindle means is positively operated in one direction or the other so as to move the wedge in one direction or the other to open or close the valve.

Figure 3:
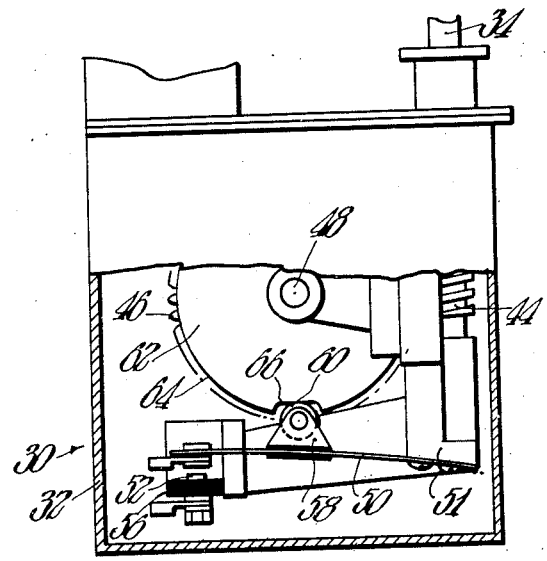
Fig. 3 is a partial elevational and sectional elevational view showing one form of limit switch.
Figure 2:
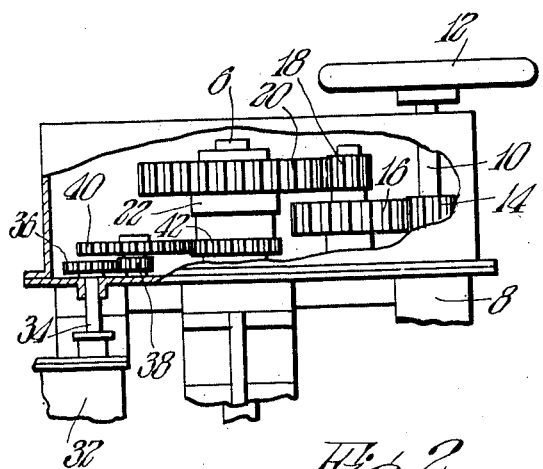
Fig. 2 is an enlarged partial sectional and elevational view of the valve shown in Fig. 1 to illustrate a certain form of operating mechanism.

Means is provided to limit movement of the wedge in its movement to closed and open position and to bring about reversal of the motor when the limit of travel of the wedge is reached. This may take various forms but one form adapted for the purpose of the invention is shown in Figs. 2 and 3.

A limit switch device represented by 30 has a casing 32 in which is rotatable a shaft 34. This shaft is connected by gearing 36, 38, 40 and 42 to the spindle means or driving connections so that it is driven positively by the connections during all rotation of the motor in opening or closing the valve.

A worm 44 on the shaft 34 meshes with a worm gear 46 fixed on a rotatable shaft 48 so that shaft 48 is rotated all the times the motor is in operation. Flexible contact members such as 50 have their one ends secured to brackets 51 and their outer ends are arranged to engage contact members such as 52 which are suitably supported by insulation 56.

Each contact member 50 has a block 58 secured thereto in which a roll such as 60 is journalled. Discs 62 are fixed on shaft 48 for operating the contacts 50 and they are arranged with relatively high and low peripheral parts such as 64 and 66, which discs cause the contacts to be engaged and disengaged.

There are four such contact members as 50 or two pairs of two each. One pair of contact members may be called the open-limit switch device and the other the closed-limit device.

The contacts and disc construction is such that with respect to the contacts of each pair one is open while the other is closed. That is in the open-limit switch one contact is open when the other is closed while the same applies to the closed-limit switch. In the wiring diagram of Fig. 6 the pair of contacts constituting the open-limit switch are indicated by O while the pair of the closed-limit switch are indicated by C. While certain of the members are in open position others are in closed position and as the motor operates to open or close the valve the position changes when the wedge has reached its limit of opening or closing movement.

Figure 6:
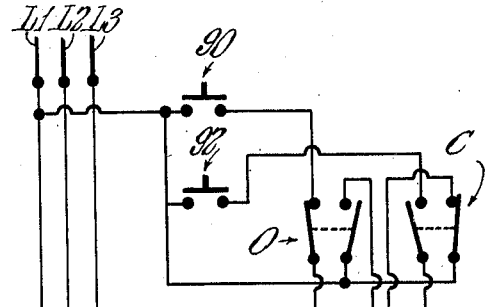
Fig. 6 is a wiring diagram showing one form of a circuit arrangement for practicing the invention.
Figure 6:
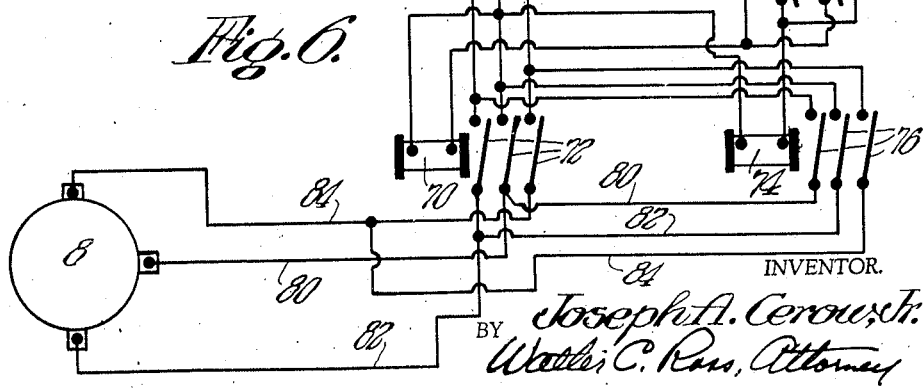

In Fig. 6 a source of energy is represented by L1, L2 and L3. A relay 70, which may be called the opening relay, has three movable switch arms 72 while a closing relay 74 has similar arms 76. The arms of one relay are interconnected with those of the other and with the motor 8 by connections 80, 82 and 84, as shown. These relays 70 and 74 may be termed direction switch devices.

A starting button or switch for opening the valve is shown at 90 while a similar switch for closing the valve is shown at 92. The starting switches, contacts of the limit switches, and contacts for the relay arms are connected, as shown.

The operation of the mechanism already described will be explained before the remainder of the apparatus is described.

Let us assume that the valve wedge is in closed position and it is desired to open the valve by moving the wedge to its open position.

In this case, switch 90 is closed and thereby relay 70 is energized so that arms 72 make their related contacts with the result that the motor operates in such a direction that through the operating or driving connections the spindle means moves the wedge towards its open position.

The right hand arm of the open-limit switch O is open and the other is closed during rotation of the motor and the left hand contact of the closed-limit switch C is closed while the right hand one is open, as shown. During rotation of the motor the discs of the limit switch mechanism rotate, they being positively driven by the driving connections.

The contacts of the limit switch remain in the position referred to and shown until the wedge reaches its open position. The discs then shift, or shift the contacts of the limit switch mechanism, from the positions shown so that they are set for subsequently closing the valve.

Subsequently if wedge closing switch 92 is operated, relay 74 is energized to move arms 76 into engagement with their respective contacts, thereby reversing the motor for moving the wedge to closed position.

The cutting out of the motor at the limit of movement of the wedge to closed position would, however, result in the motor overrunning so that the wedge drifts or overtravels which is very objectionable and is obviated by means to be described and which brings the motor to a stop. That is, when the limit switch mechanism operates with the motor rotating in one direction so that it disconnects the relay for that direction novel means cuts in the other relay so that the motor is energized for rotation in a reverse direction.

For this purpose there are two switches O2 and O4 which may be called stop switches. These have arms connected to the fixed contacts of the limit switch mechanism and fixed contacts which are connected to the relays 70 and 74 as shown.

One of the arms is arranged to make its contact during rotation of the driving connections or motor in one direction while the other makes its contact when the motor rotates in a reverse direction. Both arms are disengaged from their contacts when rotation ceases.

The stop switch mechanism is hereinafter described more fully but its operation in conjunction with the operation above described will first be explained.

When switch 90 is closed to rotate the motor in opening direction and open the valve as aforesaid, the stop switch arm of stop switch O2 closes a circuit to the relay 74 for reversing the motor and remains in closed position during rotation of the motor. When the wedge reaches its open position and the limit switch O operates, as aforesaid, the right hand contact thereof makes its contact so that relay 74 is energized through stop switch O2 for reversing the motor.

The motor being energized for rotation in a direction opposite to that in which it is rotating, it comes to a stop for reverse rotation. When rotation ceases, the arm of stop switch O2 disengages its contact so that relay 74 is de-energized. The arm of switch O4 operates similarly when the motor is rotating in an opposite direction to close the valve, or move the wedge to closed position.

The stop switch mechanism O2 and O4 may take various forms but will preferably depend for their switch-closing function on the rotation of some part such as the motor or an element of the driving mechanism.

Figure 4:
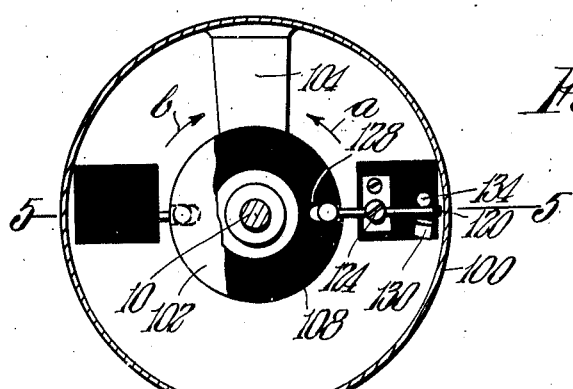
Fig. 4 is a sectional plan view on the line 4—4 of Fig. 1 to explain one form of stop mechanism.
Figure 5:
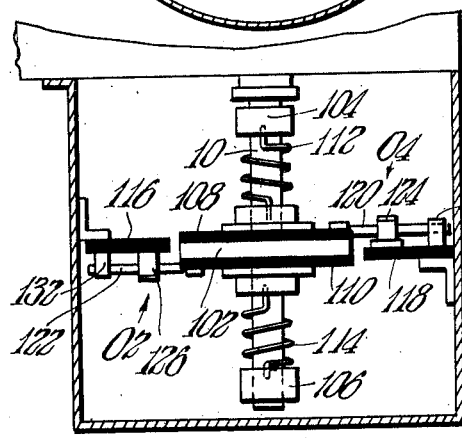
Fig. 5 is a sectional elevational view on the line 5—5 of Fig. 4.

Such a mechanism will be described with reference to Figs. 4 and 5 where the switch mechanism is associated with the motor shaft 10 and is enclosed by a casing 100.

The stop switch mechanism includes a disc 102 fixed on the shaft 10 which is rotatable in bearings 104 and 106 carried by the casing, and circuit opening and closing duplicate mechanism. Discs 108 and 110 are loose on shaft 10 and are urged into frictional engagement with the disc 102 by springs 112 and 114. Insulating blocks 116 and 118 supported by the casing have swingable switch arms 120 and 122 pivoted at 124 and 126 to said blocks.

The inner ends of the arms are disposed in notches, such as 128, of the discs 108 and 110 and contacts 130 and 132 for engagement by the arms are carried by the insulation blocks as are stops such as 134. The springs urge the discs 108 and 110 towards the disc 102 so that rotation of the disc 102 tends to cause the said discs 108 and 110 to be rotated thereby. The said springs have their opposite ends anchored in the brackets and discs so as to rotate the said discs relative to the central disc in opposite directions.

As motor shaft 10 rotates in one direction or the other for opening or closing the valve, the disc 102 frictionally engages to rotate one of the discs in engagement therewith so that the switch arm associated therewith is brought into engagement with its contact, closing a circuit including the arm and contact. As an example, when shaft 10 is rotated in the direction of arrow a, the upper disc 108 which is frictionally engaged by the disc 102 is rotated to move arm 120 into engagement with its contact 130. When shaft 10 slows down and comes to rest the spring 112 rotates disc 108 reversely relative to disc 102 to move arm 120 away from contact and against its stop 134.

Thus when shaft 10 is rotating in the direction of arrow a the arm 120 and contact are engaged to close a circuit in which they are included but when the shaft comes to rest the circuit is broken. The mechanism of the other stop switch operates similarly.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for operating the spindle means of a valve or the like to open and close the wedge thereof comprising, a reversible motor and driving connections positively connecting the same to a spindle means, starting switch means, a limit switch means for inclusion in a circuit to cut the circuit when the wedge reaches the limit of its movement in opening or closing, direction switch means for inclusion in a circuit to energize said motor from a power supply so that it operates in one of two directions for opening or closing the wedge, stop switch means for inclusion in a circuit connected to and positively operated by the driving connections, and circuit means including said motor, starting switch means, limit switch mechanism, direction switch means and stop switch means for connection to a power supply, all adapted whereby as said wedge reaches the limit of movement in one direction with the motor operating in a certain direction the said direction switch means is operated by the limit switch means to energize the motor for rotation in a reverse direction and arranged so that as the motor stops for reversal it is cut off from the power supply by the stop switch until a subsequent operation of the starting switch.

2. Apparatus for operating the spindle means of a valve or the like to open and close the wedge thereof comprising, a reversible motor and positive driving connections for connecting the same to a spindle means, starting means, a limit switch means for inclusion in a circuit to cut the circuit when the wedge reaches the limit of its movement in opening or closing, direction switch means for inclusion in a circuit to energize said motor from a power supply so that it operates in one of two directions for opening or closing the wedge, stop switch means for inclusion in a circuit connected to and positively operated by the driving connections, and circuit means including said motor, starting switch means, limit switch mechanism, direction switch means and stop switch means for connecting to a power supply, all adapted whereby as said wedge reaches the limit of movement in one direction with the motor operating in a certain direction the said direction switch means is operated to energize the motor for rotation in a reverse direction and arranged so that as the motor stops for reversal it is cut off from the power supply by the stop switch means until a subsequent operation of the starting switch, the said limit switch means adapted for positive operation by the driving connections.

3. Apparatus for operating the spindle means of a valve or the like to open and close the wedge thereof comprising, a reversible motor and positive driving connections for connecting the same to a spindle means, starting switch means, a limit switch means for inclusion in a circuit to cut the circuit when the wedge reaches the limit of its movement in opening or closing, direction switch means for inclusion in a circuit to energize said motor from a power supply so that it operates in one of two directions for opening or closing the wedge, stop switch means for inclusion in a circuit connected to and positively operated by said motor, and circuit means including said motor, starting switch means, limit switch mechanism, direction switch means and stop switch means for connecting to a power supply, all adapted whereby as said wedge reaches the limit of movement in one direction with the motor operating in a certain direction the said direction switch means is operated by the limit switch means to energize the motor for rotation in a reverse direction and arranged so that as the motor stops for reversal it is cut off from the power supply by the stop switch means until a subsequent operation of the starting switch, the said direction switch means adapted for operation by energy supplied through the circuit means.

JOSEPH A. CEROW, Jr.